Dec. 9, 1924.
I. S. DAVIS
1,518,838
FLOAT GAUGE FOR AUTOMOBILE RADIATORS
Filed Nov. 2, 1921
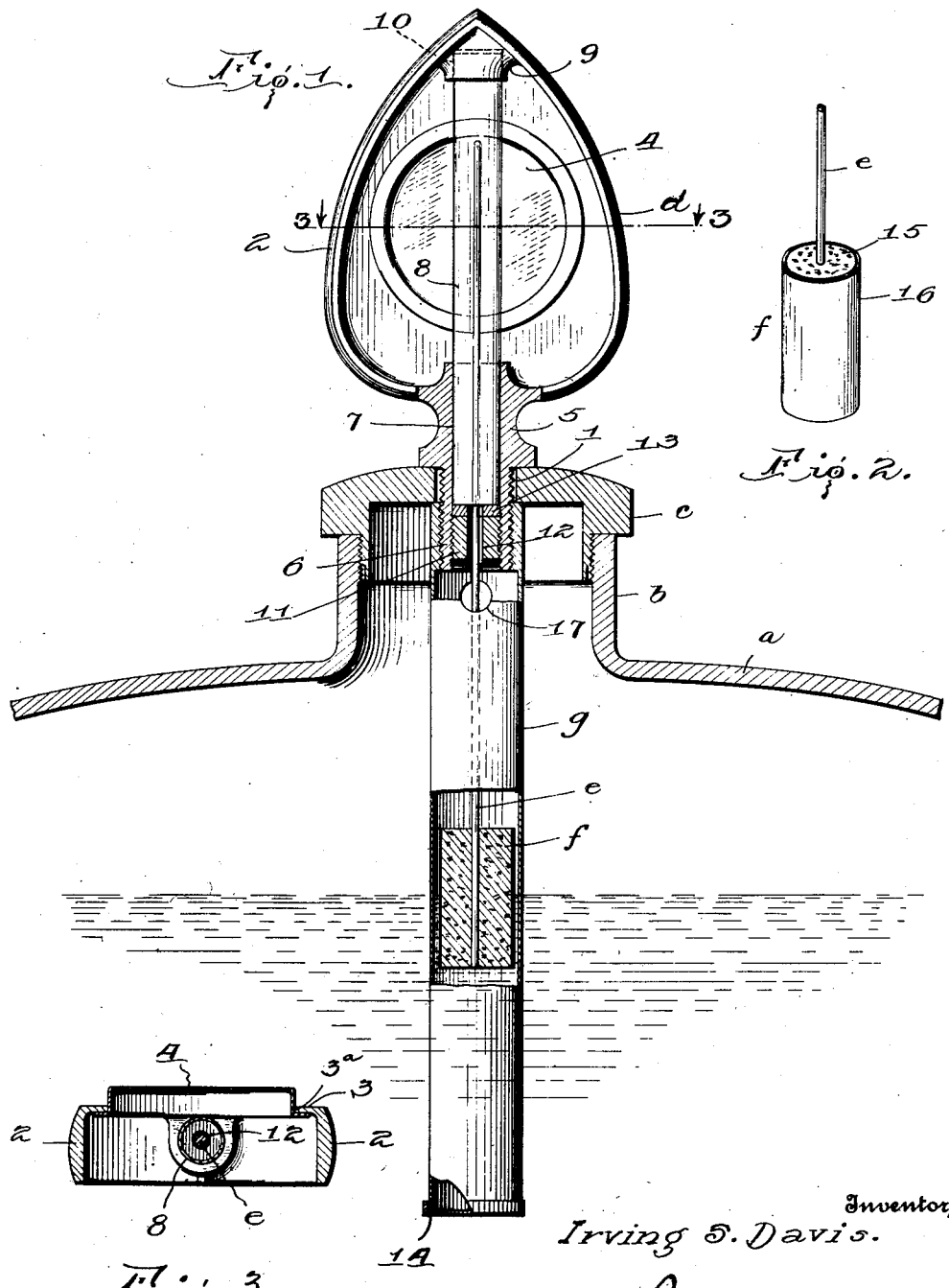
Inventor,
Irving S. Davis.
By Robert Watson
Attorney Patented Dec. 9, 1924.

1,518,838

UNITED STATES PATENT OFFICE.

IRVING S. DAVIS, OF ROSELLE, NEW JERSEY.

FLOAT GAUGE FOR AUTOMOBILE RADIATORS.

Application filed November 2, 1921. Serial No. 512,257.

*To all whom it may concern:*

Be it known that I, IRVING S. DAVIS, a citizen of the United States, residing at Roselle, in the county of Union and State of New Jersey, have invented certain new and useful Improvements in Float Gauges for Automobile Radiators, of which the following is a specification.

This invention relates to improvements in float gauges, for indicating the water level in automobile radiators, of the type comprising a head of suitable design which projects above the radiator cap and supports a gauge glass, a tube extending below the cap into the water space in the raidator, a float within the tube, and an indicating rod attached to the float and extending into the gauge glass. More particularly, the invention relates to means for mounting the gauge glass and for guiding the indicating rod, to features of construction of the float whereby the float moves freely in response to changes in water level, and to details of construction whereby the device can be manufactured at small cost and can be readily assembled or taken apart.

In the accompanying drawing,

Fig. 1 is a rear elevation of the indicator, partly in central section, showing the same applied to an automobile radiator, a part of the latter being shown in section;

Fig. 2 is a perspective view of the float; and,

Fig. 3 is a section on the line 3—3 of Fig. 1.

Referring to the drawing, $a$ represents the top of an automobile radiator, $b$ the filling tube, and $c$ the cap or closure for the tube, which latter is provided with a central opening 1, adapted to receive the float gauge. The float gauge comprises a hollow head $d$, preferably of the design shown, having heart-shaped side walls 2, and a front wall 3, which latter has a circular opening $3^a$, adapted to receive a name plate 4. The head has a base 5 of larger diameter than the opening in the cap, and an externally threaded nipple 6, which extends through the opening in the cap, the base and nipple being integral with the head. The nipple and base having a bore 7, to receive a closely fitting gauge glass 8, and the apex of the head is internally thickened, as shown at 9, and bored to form a socket 10, for receiving the upper end of the gauge glass, as indicated in dotted lines. The lower end of the nipple is internally threaded and adapted to receive a screw plug 11, which has a central bore 12. This plug holds the gauge glass in position and also serves as a guide for an indicating rod $e$, which is attached to a float $f$ and extends through the bore in the plug and into the gauge glass. Preferably, a washer 13 of relatively soft metal is placed between the plug and the bottom of the gauge glass to avoid injury to the glass by the turning movement of the plug when the latter is tightened. A tube $g$, preferably of copper, is threaded on to the nipple 11 and extends downwardly into the water space in the radiator, this tube being provided with a vent opening 17, near its upper end and with a suitable stop 14 at its lower end, the latter to prevent the float from passing out of the tube when the water becomes very low. The stop is shown in the drawing in the form of an apertured cap.

The float consists of a cylinder of cork 15, surrounded by a thin cylindrical shell or casing of metal 16, preferably aluminum, because if its lightness. The indicating rod $e$, which is made of aluminum, fits tightly within an axial bore in the cork. The cork float with aluminum indicating rod is very light and floats readily in the water, but the cork body alone, without the surrounding metal casing, would not work satisfactorily because of the tendency of the cork body to adhere to the sides of the tube. In order to overcome as far as possible the forces of adhesion and capillary attraction between the tube and float, and to lessen the friction, I surround the cork with a thin aluminum shell, and, thus enclosed, the float moves with freedom in the tube.

The float gauge can be readily assembled and taken apart. By removing the tube $g$, the float and indicating rod can be taken out, and by removing the plug 11 the gauge glass can be pushed out through the opening in the base and nipple of the head. The upper end of the indicating rod, which is visible from the driver's seat, will indicate the water level in the radiator. The plug 12 forms a relatively short guide through which the rod $e$ may move with a minimum amount of friction. Since the lifting power of the float is only a small fraction of an ounce, it is desirable to eliminate friction on the rod as much as possible.

What I claim is:

1. In a water level indicator, a hollow head having a socket in its upper part and having a base and nipple provided with a bore alining with said socket, said socket, base and nipple being integral with the head, a gauge glass fitting in said bore and socket, a relatively short plug threaded into said bore and adapted to support the gauge glass, said plug having a central bore, a tube having a threaded engagement with said nipple, a float within the tube, and an indicating rod attached to said float and extending through the bore in the plug and into the gauge glass.

2. In a water level indicator for automobile radiators, a head, a gauge glass mounted in the head, a tube detachably connected to the head, a float in said tube comprising a cork body and a metal shell encasing said body, and an indicating rod extending from the float into said gauge glass.

3. In a water level indicator for automobile radiators, a head, a gauge glass mounted in the head, a tube detachably connected to the head, a float in said tube comprising a cork body and a shell of aluminum encasing said body, and an aluminum indicating rod extending from the float into the gauge glass.

In testimony whereof I affix my signature.

IRVING S. DAVIS.